United States Patent
Mitsuhashi

(10) Patent No.: US 10,734,621 B2
(45) Date of Patent: Aug. 4, 2020

(54) BATTERY STRUCTURE, BATTERY SYSTEM AND VEHICLE

(71) Applicant: TOYOTA JIDOSHA KABUSHIKI KAISHA, Toyota-shi, Aichi-ken (JP)

(72) Inventor: Hideto Mitsuhashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 15/791,224

(22) Filed: Oct. 23, 2017

(65) Prior Publication Data
US 2018/0114963 A1    Apr. 26, 2018

(30) Foreign Application Priority Data
Oct. 26, 2016  (JP) .................. 2016-209749

(51) Int. Cl.
| | |
|---|---|
| *H01M 2/00* | (2006.01) |
| *H01M 2/12* | (2006.01) |
| *H01M 2/10* | (2006.01) |
| *H01M 10/52* | (2006.01) |
| *H01M 2/02* | (2006.01) |

(52) U.S. Cl.
CPC ............. *H01M 2/12* (2013.01); *H01M 2/024* (2013.01); *H01M 2/1072* (2013.01); *H01M 10/52* (2013.01); *H01M 2220/20* (2013.01)

(58) Field of Classification Search
CPC ...... H01M 2/12; H01M 2/024; H01M 2/1072; H01M 2220/20; H01M 10/52
See application file for complete search history.

(56) References Cited

U.S. PATENT DOCUMENTS

| | | | | | |
|---|---|---|---|---|---|
| 4,468,440 | A | * | 8/1984 | Evjen ................. | H01M 10/63 429/120 |
| 7,718,289 | B2 | * | 5/2010 | Asai .................. | H01M 8/04089 429/408 |
| 8,298,692 | B2 | * | 10/2012 | Hermann .......... | H01M 8/04089 429/50 |
| 10,177,416 | B2 | * | 1/2019 | Fujiwara ............ | H01M 10/049 |
| 2004/0106023 | A1 | * | 6/2004 | Ueda ................. | H01M 8/04388 429/432 |

(Continued)

FOREIGN PATENT DOCUMENTS

| | | |
|---|---|---|
| JP | 2004-178845 A | 6/2004 |
| JP | 2006-182264 A | 7/2006 |

(Continued)

*Primary Examiner* — Milton I Cano
*Assistant Examiner* — Mary G Henshaw
(74) *Attorney, Agent, or Firm* — Oliff PLC

(57) ABSTRACT

An object of the present disclosure is to efficiently release moisture, gas, and the like from the inside of an exterior body when moisture enters inside or when gas and the like is generated after a battery cell is put inside the exterior body, while inhibiting inrush of moisture to the inside. Provided is a battery structure comprising an exterior body and at least one battery cell housed inside of the exterior body which includes an openable and closable inlet introducing dry air to the inside from the outside of the exterior body, and an openable and closable outlet separate from the inlet releasing gas from the inside to the outside of the exterior body. When both of the inlet and the outlet are closed, pressure inside the exterior body is kept higher than atmospheric pressure.

11 Claims, 6 Drawing Sheets

(56) References Cited

U.S. PATENT DOCUMENTS

| | | | | |
|---|---|---|---|---|
| 2014/0072839 A1* | 3/2014 | Park | .................... | H01M 2/345 |
| | | | | 429/50 |
| 2014/0205873 A1* | 7/2014 | Klausner | ............... | H01M 10/42 |
| | | | | 429/61 |
| 2015/0024291 A1* | 1/2015 | Ito | ........................ | H01M 12/08 |
| | | | | 429/405 |
| 2015/0214587 A1* | 7/2015 | Achhammer | ........... | B60L 50/16 |
| | | | | 429/61 |

FOREIGN PATENT DOCUMENTS

| | | | |
|---|---|---|---|
| JP | 2008-287970 | A | 11/2008 |
| JP | 2009-054303 | A | 3/2009 |
| JP | 2012-119153 | A | 6/2012 |
| JP | 2012-169204 | A | 9/2012 |
| JP | 2015-099675 | A | 5/2015 |
| JP | 2015-219942 | A | 12/2015 |
| JP | 2015219942 | A * | 12/2015 |
| JP | 2016-062712 | A | 4/2016 |

* cited by examiner

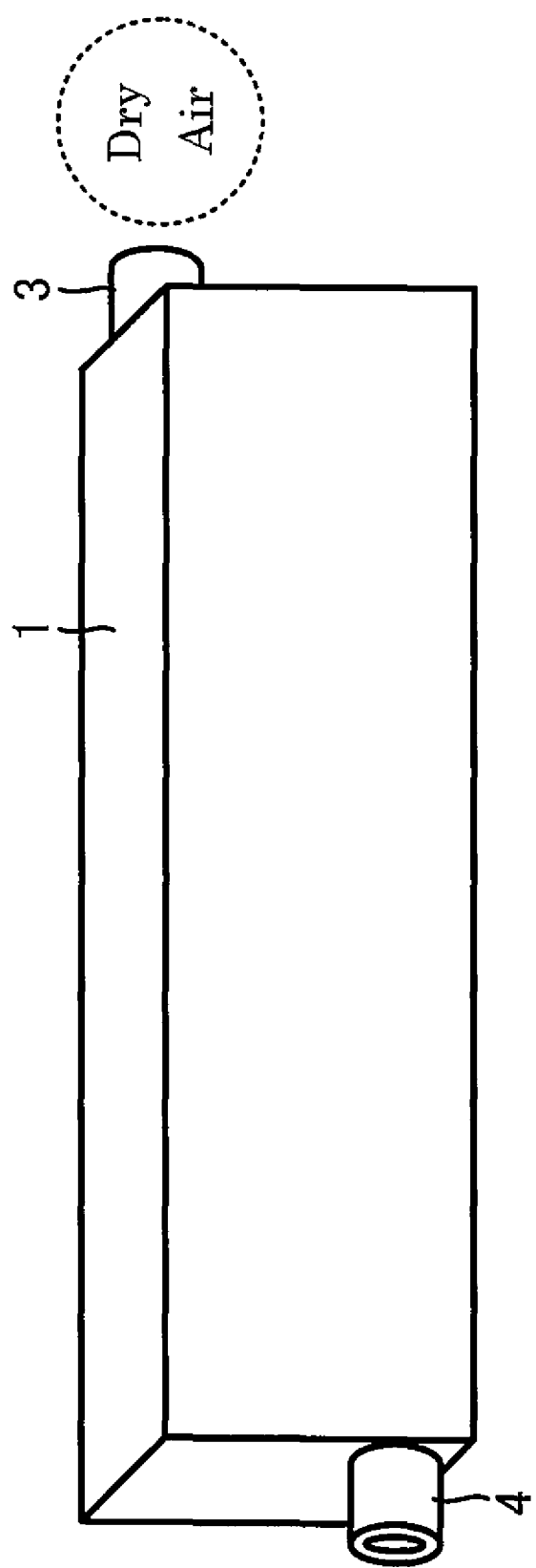

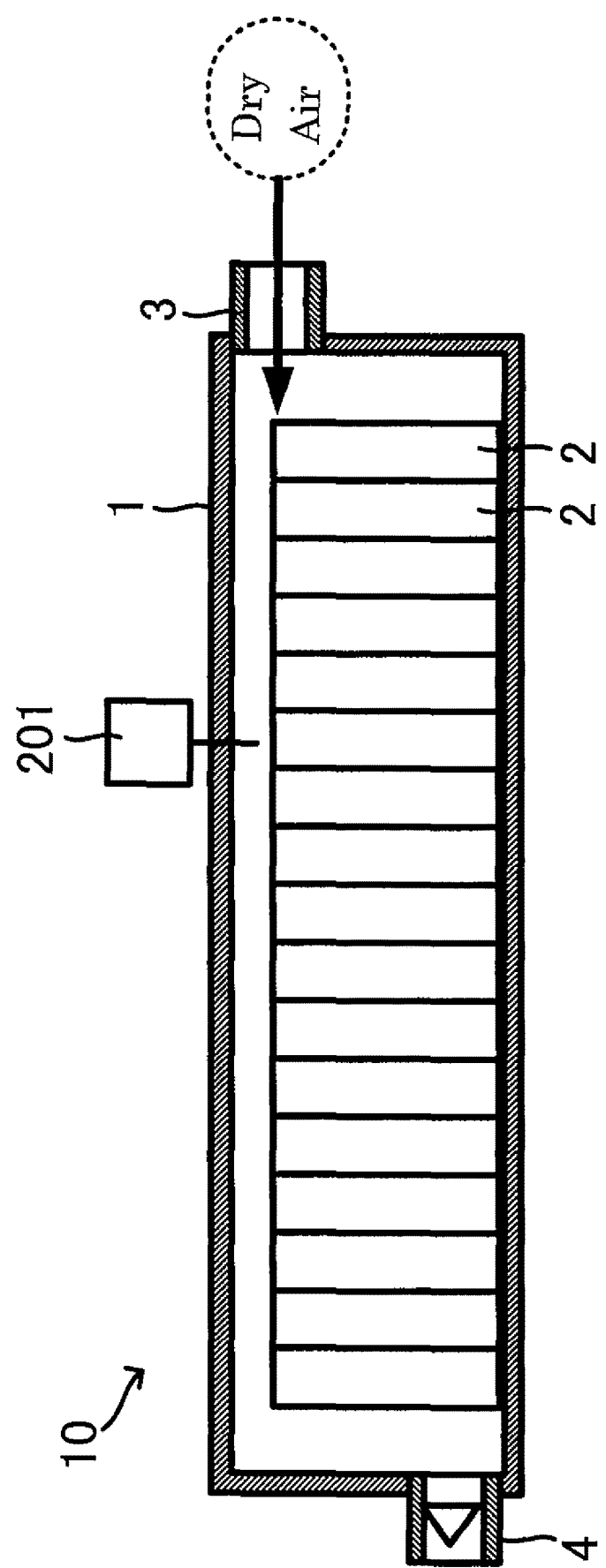

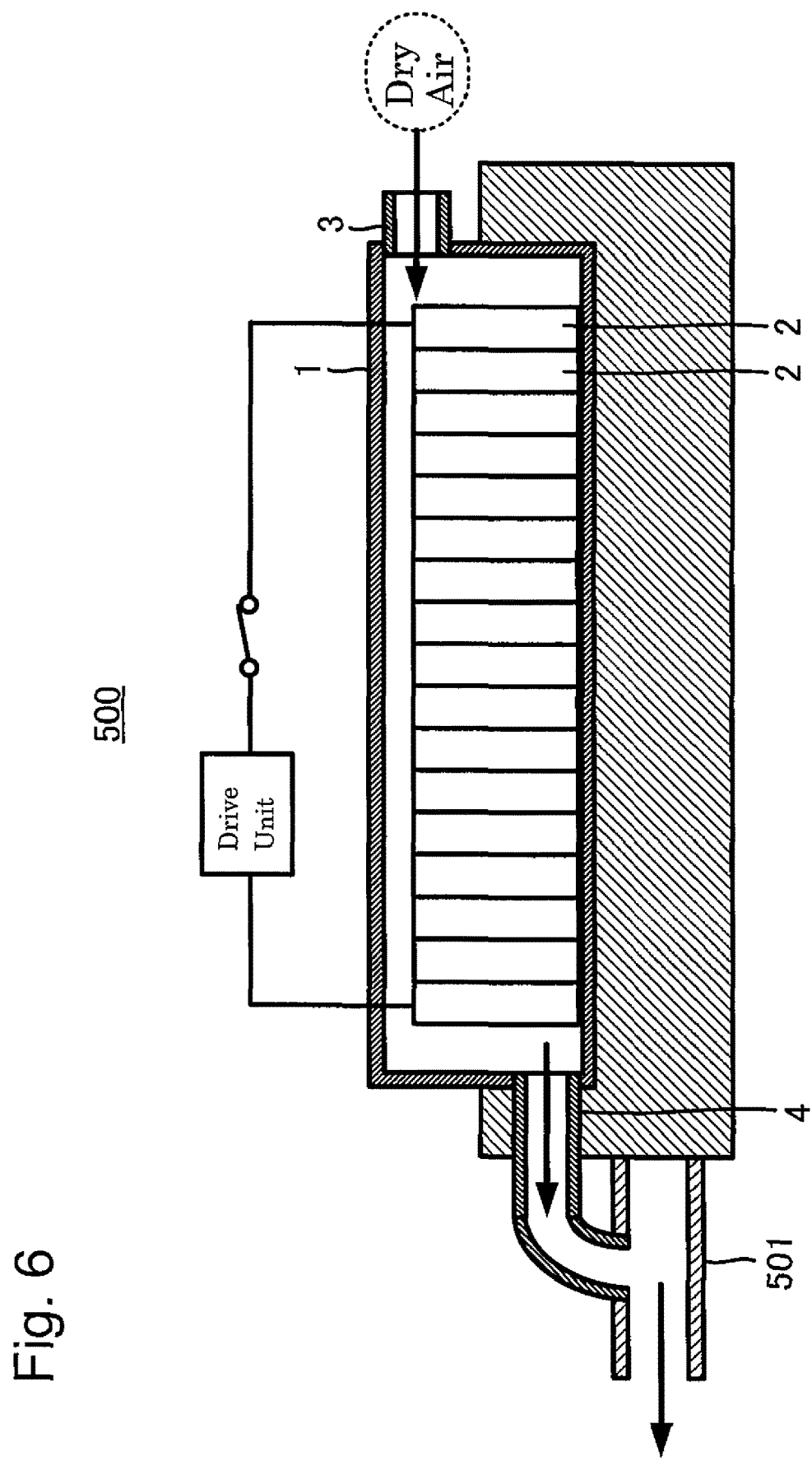

BATTERY STRUCTURE, BATTERY SYSTEM AND VEHICLE

FIELD

The present disclosure relates to a battery structure, a battery system comprising the battery structure, and a vehicle comprising the battery system.

BACKGROUND

Patent literature 1 discloses that a purpose is to isotropic-pressurize a battery cell which is contained inside an exterior body to reduce internal resistance of the battery cell. As an achievement means of the purpose, patent literature 1 discloses filling and sealing low-temperature gas inside the exterior body which contains the battery cell, and sealing the exterior body. Patent literature 1 also discloses that dry air is preferable as the gas, and that the pressure of the gas when the battery is used is preferably no less than 0.01 MPa and no more than 20 MPa.

Patent literature 2 discloses that a purpose is to easily detect leakage of gas from an exterior body. As an achievement mean of the purpose, patent literature 2 discloses a technique of covering at least part of an outer surface of the exterior body with a material accommodated for detecting leakage of gas from the exterior body. In patent literature 2, the battery cell is also pressurized by filling gas inside of the exterior body.

Patent literature 3 discloses that a purpose is to cool the whole battery module uniformly. As an achievement means of the purpose, patent literature 3 discloses a technique that a cooling medium can be supplied to the inside of an exterior body so as to cool a battery module, and pressure inside the exterior body can be released depending on a temperature difference between a high temperature point and a low temperature point of the battery module. In patent literature 3, cooling air using air is disclosed as the cooling medium supplied to the inside of the exterior body. However, considering function as a cooling medium, using air containing moisture is considered to be preferable.

Patent literature 4 discloses that a purpose is to discharge moisture inside an exterior body (moisture which is attached during an all-solid-state battery manufacturing process) into an outside of the exterior body without adopting construction which decreases volume energy density of batteries. As an achievement means of the purpose, patent literature 4 discloses a technique of eliminating moisture which is contained inside the exterior body through a non-return valve by heating the exterior body from the outside of the exterior body after providing the non-return valve for the exterior body. In patent literature 4, eliminating moisture from the inside of the exterior body makes atmosphere inside the exterior body have reduced pressure.

CITATION LIST

Patent Literatures

Patent Literature 1: JP2012-119153A
Patent Literature 2: JP2012-169204A
Patent Literature 3: JP2009-054303A
Patent Literature 4: JP2016-062712A

SUMMARY

Technical Problem

It is considered an object in a battery structure in which an exterior body containing a battery cell thereinside is sealed to inhibit an inrush of moisture to the inside of the exterior body after the battery cell is housed inside the exterior body in order to obtain long-term reliability. This is because when moisture enters into the inside of the exterior body, battery materials and the moisture may react and the battery materials may be deteriorated, and the reaction between the battery materials and the moisture may cause gas and the like to be generated. In addition, it is also considered an object in a case where moisture enters inside the exterior body for some reason and gas and the like are generated after the battery cell is housed inside the exterior body, to eliminate the moisture, the gas, and the like from the inside of the exterior body. In patent literatures 1 to 4, these objects are not considered at all, and of course, these patent literatures do not disclose any achievement means to these objects.

Solution to Problem

As one of means to solve the above-described problems, the present application discloses a battery structure comprising an exterior body and at least one battery cell contained inside the exterior body, the exterior body comprising an openable and closable inlet introducing dry air from outside of the exterior body to an inside of the exterior body and an openable and closable outlet separate from the inlet, and the outlet releasing gas from the inside of the exterior body to the outside of the exterior body, wherein the inlet and the outlet are closed, pressure inside the exterior body is kept at higher pressure than atmospheric pressure.

"Exterior body" is a structure which has a space thereinside. The space inside the exterior body has a certain volume which makes it possible for the exterior body to house a battery cell.

"Battery cell" comprises at least a cathode, an anode, and an electrolyte, and electric energy can be taken out therefrom by an electrochemical reaction.

"Dry air" is usually air which has lower moisture concentration than air of the outside of the exterior body (atmospheric air). For example, "air which has a dew point of −20° C. or below" can be employed as "dry air" in the present disclosure.

"Openable and closable outlet" is reversibly changeable between open-condition and close-condition, and allows gas inside the exterior body to circulate at open-condition.

"Comprising an openable and closable inlet introducing dry air from outside of the exterior body to inside of the exterior body and an openable and closable outlet separate from the inlet" means that the inlet and the outlet are arranged on different points of the exterior body.

The battery of the present disclosure preferably comprises a first structure arranged on an upstream side of the inlet, the first structure drying air.

When the inlet arranged between the outside of the exterior body and the inside of the exterior body is used as a benchmark, the outer side of the exterior body is referred to as "upstream", and the inner side of the exterior body is referred to as "downstream".

The battery structure of the disclosure preferably comprises a second structure arranged on an upstream side of the inlet, the second structure pressurizing air.

As one of means to solve the above-described problems, the present application discloses a battery system comprising the battery structure according to the present disclosure, configured to open both of the inlet and the outlet, release the gas from the inside of the exterior body to the outside of the exterior body through the outlet while introducing the dry air to the inside of the exterior body through the inlet, when the battery cell is operated, and configured to close both of the inlet and the outlet, and keep the pressure inside the exterior body higher than atmospheric pressure, when the battery cell is not operated.

"When the battery cell is operated" means while electric energy is being taken out from the battery cell to the outside. For example, when a mechanical drive unit is operated using electric energy from the battery cell, it means while the mechanical drive unit is operated. In addition, a condition where energy is stored by regeneration and the like is also included in "when the battery cell is operated".

As one of means to solve the above-described problems, the present application discloses a battery system comprising the battery structure of the present disclosure, configured to open the inlet, and increase the pressure inside the exterior body by introducing the dry air to the inside of the exterior body through the inlet, when the pressure inside the exterior body is no more than a first threshold.

As one of means to solve the above-described problems, the present application discloses a battery system comprising the battery structure of the present disclosure, configured to release the gas from the inside of the exterior body to the outside of the exterior body through the outlet while introducing the dry air into the inside of the exterior body through the inlet, when both of the inlet and the outlet are opened.

In this case, the battery system of the present disclosure is preferably configured to open both of the inlet and the outlet, when an amount of moisture inside the exterior body is no less than a second threshold. The battery system of the present disclosure is preferably configured to open both of the inlet and the outlet, when concentration of gas generated inside the exterior body is no less than a third threshold. "Gas generated inside the exterior body" means, for example, gas generated by decomposition of battery materials. Specific examples of the gas include hydrogen sulfide and carbon monoxide.

The battery system of the present disclosure can be preferably used as, for example, a vehicle-mounted power source. That is, a vehicle comprising the battery system of the present disclosure, wherein the outlet of the exterior body is connected to an exhaust duct of the vehicle, and the gas which is released from the inside of the exterior body to the outside of the exterior body through the outlet is exhausted thorough the exhaust duct to the outside of the vehicle.

As "exhaust duct", any exhaust duct provided for a vehicle may be employed. A duct such as a duct that releases an exhaust air directly from the exterior body to the outside of the vehicle may be separately employed.

Effects of Invention

The battery structure of the present disclosure keeps pressure inside the exterior body higher than atmospheric pressure. Especially, it is possible for the battery structure of the present disclosure to introduce dry air to the inside of the exterior body through the inlet, and to increase pressure inside the exterior body by the dry air easily. Increasing the pressure inside the exterior body to be higher than atmospheric pressure as described above makes it possible to inhibit moisture under atmospheric pressure existing outside the exterior body from entering to the inside of the exterior body.

In addition, in the battery structure of the present disclosure, the exterior body separately comprises the openable and closable inlet and the openable and closable outlet. Thus, in the battery structure of the present disclosure, it is possible to circulate dry air from the inlet to the outlet while the inlet and the outlet are open, and thus to replace the gas inside the exterior body with the dry air efficiently. That is, even when gas and the like is generated due to an inrush of moisture to the inside of the exterior body for any reason after the exterior body containing the battery cell thereinside is sealed, it is possible to efficiently eliminate the moisture, the gas and the like from the inside of the exterior body to the outside of the exterior body through the outlet.

BRIEF DESCRIPTION OF DRAWINGS

FIG. 2 is a schematically explanatory view of a configuration of an outside of the battery structure 10, showing only an exterior body 1, an inlet 3 and an outlet 4 of the battery structure 10;

FIG. 4 is a schematically explanatory view of operation of a battery system 200;

FIG. 6 is a schematically explanatory view of a configuration of a vehicle 500.

DESCRIPTION OF EMBODIMENTS

1. Battery Structure

Figure 1:
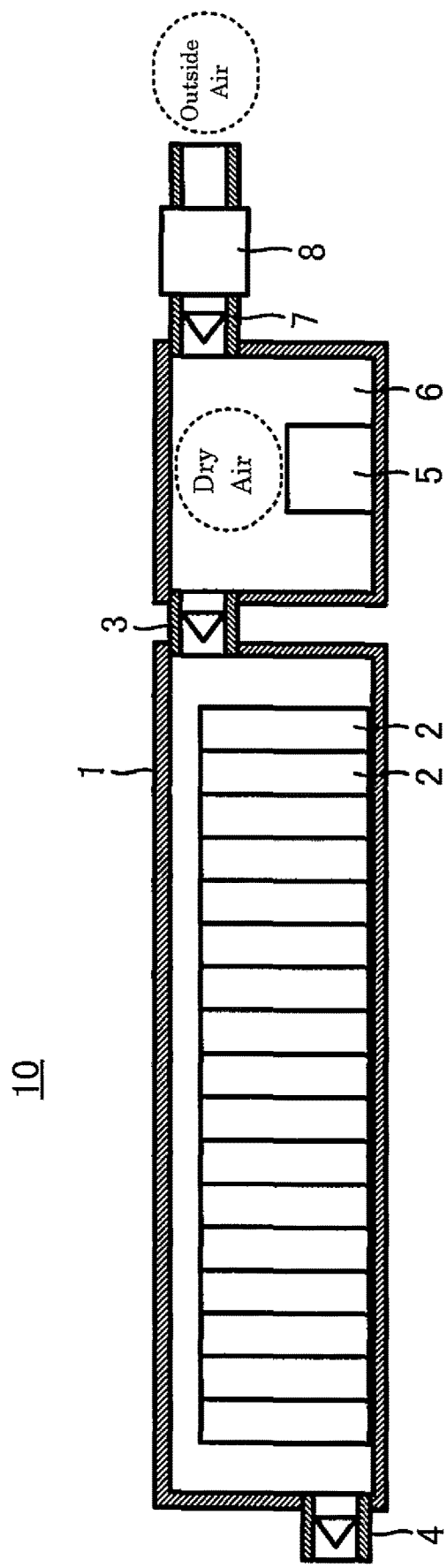
FIG. 1 is a schematically explanatory view of a configuration of a battery structure 10.

A battery structure 10 will be described with reference to FIGS. 1 and 2. The battery structure 10 includes an exterior body 1, and at least one battery cell 2 housed inside the exterior body 1. In addition, the exterior body 1 includes an openable and closable inlet 3 which can introduce dry air from the outside of the exterior body 1 to the inside of the exterior body 1, and separately from the inlet 3, an openable and closable outlet 4 which can release gas inside the exterior body 1 to the outside of the exterior body 1. Furthermore, when the inlet 3 and the outlet 4 are closed, pressure inside the exterior body 1 is kept higher than atmospheric pressure.

1.1. Exterior Body

The exterior body 1 is a structure having a space thereinside. The space inside the exterior body 1 has a certain volume which makes it possible for the exterior body to house the battery cell 2. The exterior body 1 can be employed as long as having sealability under a state where the inlet 3 and the outlet 4 are closed, which is described later, and being able to keep pressure thereinside higher than atmospheric pressure. The form of the exterior body 1 is determined by the shape of the battery cell 2. For example, a polyhedral box-type exterior body as shown in FIGS. 1 and 2 can be employed. The material of the exterior body 1 may be resin or metal. In view of easy formability and easy sealability, the exterior body 1 made of resin is preferable. For example, by coating the outside of the battery cell 2 with molten resin, and solidifying the molten resin, the outside of the battery cell 2 can be covered with the exterior body 1 made of resin, and as a result, the battery cell 2 can be housed inside the exterior body 1 made of resin.

The pressure inside the exterior body 1 is kept higher than atmospheric pressure. As the pressure which is higher than atmospheric pressure, for example, pressure at no less than 0.11 MPa can be employed. Thus, by making the pressure inside the exterior body 1 a positive pressure as described above, it is possible to inhibit an inrush of the moisture under atmospheric pressure which exists outside the exterior body 1 to the inside of the exterior body 1.

1.2. Battery Cell

The battery cell 2 includes at least a cathode, an anode, and an electrolyte, and electric energy can be taken out therefrom by an electrochemical reaction. The cathode includes a cathode mixture containing at least a cathode active material, and a cathode collector as necessary. Also, the anode includes at least an anode mixture containing an anode active material, and an anode collector as necessary. The battery cell 2 includes any non-aqueous based electrolyte solution, gel based electrolyte, organic polymer based electrolyte, inorganic solid based electrolyte. This configuration of the battery cell 2 is obvious for the person skilled in the art.

In the battery structure 10, the battery cell 2 is supposed to contain materials which is converted or deteriorated by moisture. Materials for batteries which are converted or deteriorated by moisture are obvious for the person skilled in the art. The above-described cathode, anode and electrolyte of the battery cell 2 are often converted or deteriorated by moisture. For example, the performance is deteriorated due to adsorption of water on a surface, or the performance is deteriorated by chemical reaction with water and converting substances of the materials to other substances. When materials for batteries chemically react with water, gas may be generated. For example, a non-aqueous electrolyte solution reacts with water to resolve the electrolyte solution, and carbon dioxide and carbon monoxide may be generated in addition to hydrofluoric acid. This applies to a gel electrolyte or an organic polymer electrolyte as well. Alternatively, an inorganic solid electrolyte such as a sulfide solid electrolyte may react with water to generate hydrogen sulfide.

It is noted that considering the object of the present disclosure, it is clear that an aqueous electrolyte based battery cell where an electrolyte is dissolved in water is excluded from the battery cell 2.

At least one battery cell 2 may be housed in the exterior body 1. Especially, it is preferable that a plurality of battery cells 2 be connected in series or in parallel to form an assembled battery, and the assembled battery be housed inside the exterior body 1. The battery cell 2 may be wrapped in a laminate film (laminate film made of metal foil and a resin film). That is, a laminate pack may be housed inside the exterior body 1. Even if the battery cell is wrapped in the laminate film, there may be a case where sealing (heat welding etc.) of the laminate film is imperfect or a hole may be formed on the laminate film. In such a case, moisture may enter into the laminate pack. However, as described above, the battery structure 10 can inhibit an inrush of moisture to the inside of the exterior body 1. As a result, it is also possible to inhibit the inrush of moisture to the inside of the laminate pack contained inside the exterior body 1.

1.3. Inlet

The inlet 3 introduces dry air from the outside of the exterior body 1 to the inside of the exterior body 1. That is, an internal space of the exterior body 1 exists in one end side of an opening of the inlet 3, and dry air exists in the other end side of the opening of the inlet 3. In addition, the inlet 3 is openable and closable. The inlet 3 can circulate the dry air to the inside of the exterior body 1 when the inlet 3 is open, and the inlet 3 can block the inside of the exterior body 1 from outside air when the inlet 3 is closed. A mechanism for opening and closing the inlet 3 is not particularly limited. Examples of this mechanism include a mechanism such as a non-return valve which opens and closes according to a change in pressure, and a mechanism which opens and closes by a mechanical drive unit driven by electric energy. Among them, a mechanism such as a non-return valve which opens and closes according to a change in pressure is preferable. That is, the inlet 3 is preferably structured by providing an opening for part of the exterior body 1, and providing a non-return valve for the opening. In this case, by the non-return valve, a direction of a gas flow through the inlet 3 is restricted in a direction from the outside of the exterior body 1 toward the inside of the exterior body 1. That is, when pressure higher than atmospheric pressure is given, the non-return valve opens and dry air is introduced from the outside of the exterior body 1 toward the inside of the exterior body 1 through the inlet 3. It is noted that when the inlet 3 has the above-described non-return valve, it is possible to inhibit leakage of the gas inside the exterior body 1 to the outside of the exterior body 1 through the inlet 3. Therefore, it is easy to keep the pressure inside the exterior body 1 higher than the atmospheric pressure. Further, for example, when the inlet 3 includes a hygroscopic material as a structure 5 to dry air on the upstream of the inlet 3 described later, this hygroscopic material adsorbs the gas generated inside the exterior body 1 (hydrogen sulfide, carbon monoxide, etc.) and prevents deterioration of moisture absorption performance as well.

The inlet 3 has only to be provided for part of the exterior body 1, and the position thereof is not particularly limited. The inlet 3 is preferably provided above or below the outlet 4 described later. In a case where the inlet 3 is provided above the outlet 4, it becomes easy to release gas heavier than air existing inside the exterior body 1 (above-described hydrogen sulfide etc.) to the outside of the exterior body 1. Further, when the inlet 3 is provided below the outlet 4, it becomes easy to release gas lighter than air existing the inside of the exterior body 1 (above-described carbon monoxide etc.) to the outside of the exterior body 1.

When the exterior body 1 is a polyhedron, the inlet 3 is preferably provided for a surface different from the outlet 4 described later. For example, as shown in FIGS. 1 and 2, when the exterior body 1 is a hexahedron (particularly a cuboid), preferably, the inlet 3 is provided for one surface of the exterior body 1, and the outlet 4 is provided for a surface opposite to the one surface (surface not sharing sides with the one surface). Particularly, as shown in FIGS. 1 and 2, the inlet 3 and the outlet 4 are preferably arranged on a substantially diagonal line. As such, when the gas inside the exterior body 1 is released through the outlet 4 while the dry air is introduced to the inside of the exterior body 1 through the inlet 3, it is possible to make the flow of the gas smooth, so that the dry air can easily run through inside the exterior body 1 and the gas inside the exterior body 1 can be efficiently replaced with the dry air.

The shape and size of the inlet 3 are not particularly limited. Further, the number of the inlet 3 is not limited to one. The exterior body 1 may include two or more inlets 3. The number of the inlet 3 may be appropriately determined by the shape of the exterior body 1. In addition, the inlet 3 may have a filter or the like for preventing intrusion of dust and the like.

1.4. Outlet

The outlet 4 releases gas inside the exterior body 1 to the outside of the exterior body 1. Further, the outlet 4 is openable and closable. The outlet 4 can circulate the gas inside the exterior body 1 to the outside of the exterior body 1 when the outlet 4 is opened, and block the inside of the exterior body 1 from outside air when the outlet 4 is closed. A mechanism for opening and closing the outlet 4 is not particularly limited. Examples thereof include a mechanism such as a non-return valve which opens and closes according to pressure change and a mechanism that opens and closes by a mechanical drive unit driven by electric energy. Among them, a mechanism such as a non-return valve which opens and closes according to pressure change is preferable. That is, the outlet 4 is preferably structured by providing an opening for part of the exterior body 1, and providing a non-return valve for the opening. In this case, by the non-return valve, a direction of a gas flow through the outlet 4 is restricted in a direction from the inside of the exterior body 1 toward the outside of the exterior body 1. That is, when the non-return valve opens, the gas inside the exterior body 1 is released from the inside of the exterior body 1 towards the outside of the exterior body 1 through the outlet 4. When the outlet 4 is provided with the non-return valve, it is possible to prevent invasion of outside air from the outside of the exterior body 1 to the inside of the exterior body 1 through the outlet 4. It is noted that pressure at which the non-return valve provided for the outlet 4 is opened is preferably the same as or higher than pressure at which the non-return valve provided for the inlet 3 is opened.

The outlet 4 is part of the exterior body 1 and has only to be arranged at a position different from the above-described inlet 3. Preferably, the outlet 4 is described above. The shape and size of the outlet 4 are not particularly limited. In addition, the number of the outlet 4 is not limited to one. The exterior body 1 may include two or more outlets 4. The number of the outlet 4 may be appropriately determined by the shape of the exterior body 1.

1.5. Other Structures of Battery Structure

As described above, dry air exists on the other end side of the inlet 3. The dry air is preferably generated on the upstream of the inlet 3 by using outside air. That is, as shown in FIG. 1, the battery structure 10 preferably has the structure 5 for drying air on the upstream of the inlet 3. Specific examples that can be considered as the structure 5 include various structures such as a structure of placing a hygroscopic material like silica gel, a structure of placing heating means like a heater, and a structure of placing a hygroscopic material and heating means in combination. In particular, a structure of placing a hygroscopic material and heating means in combination is preferable. Thus, when moisture adsorption performance is lost due to saturation of the moisture adsorption amount of a hygroscopic material, it is possible to regenerate the hygroscopic material by heating the hygroscopic material with heating means, to desorb moisture.

The structure 5 has only to be positioned on the upstream side of the inlet 3. For example, as shown in FIG. 1, it is possible to arrange a space 6 connected to the inlet 3 on the upstream side of the inlet 3, and to arrange the structure 5 inside the space 6. The space 6 can take in outside air through an openable and closable outside air supply port 7. That is, air is taken in from the outside into the space 6 through the supply port 7 and the air is dried by the structure 5, whereby dry air can be obtained. In this case, the supply port 7 is preferably provided with a non-return valve. This is because it is possible to inhibit a leakage of the air which is dried by the structure 5 to the outside through the supply port 7.

As described above, when both of the inlet 3 and the outlet 4 are closed, the pressure inside the exterior body 1 is kept higher than atmospheric pressure. For example, it is possible to keep the pressure inside the exterior body 1 higher than atmospheric pressure easily by closing both of the inlet 3 and the outlet 4 after dry air at high pressure is introduced from the inlet 3 to the inside of the exterior body 1 to raise pressure inside the exterior body 1. That is, the battery structure 10 is preferably provided with a structure 8 which pressurizes air on the upstream side of the inlet 3. As such a structure, for example, a structure of providing pressure raising means such as a pump can be considered.

The structure 8 has to be positioned on the upstream side of the inlet 3. For example, as shown in FIG. 1, the structure 8 can supply air at high pressure from the supply port 7 to the space 6 by arranging space 6 connected to the inlet 3 on the upstream side of the inlet 3, connecting the openable and closable outside air supply port 7 to the space 6, and then raising pressure of outside air by the structure 8. Alternatively, the structure 8 may be arranged at any position other than that shown in FIG. 1. For example, it is possible to introduce dry air at high pressure to the inside of the exterior body 1 through the inlet 3 after the dry air made by the structure 5 is pressurized by the structure 8, by arranging the structure 8 between the structure 5 and the inlet 3.

In addition, as described above, when both of the inlet 3 and the outlet 4 are closed, the pressure inside the exterior body 1 is kept higher than atmospheric pressure. In this point, the battery structure 10 preferably includes a pressure sensor to observe the pressure inside the exterior body 1.

In addition, in FIGS. 1 and 2, terminals for connecting a plurality of the battery cells 2 in series or in parallel, terminals for taking out electric energy from the battery cell 2 to the outside of the exterior body 1, and the like are omitted for the convenience of explanation. In the battery structure 10, the structure of placing these terminals and the like can be the same as the conventional structure.

As described above, in the battery structure 10, the pressure inside the exterior body 1 is kept higher than atmospheric pressure. In particular, in the battery structure 10, it is possible to introduce the dry air from the inlet 3 to the inside of the exterior body 1, and to increase the pressure inside the exterior body 1 easily by the dry air. Thus, it is possible to inhibit an inrush of moisture under atmospheric pressure which exists outside the exterior body 1, into the inside of the exterior body 1.

Further, in the battery system 10, the exterior body 1 separately includes the openable and closable inlet 3 and the openable and closable outlet 4. Thus, it is possible to circulate the dry air from the inlet toward the outlet while both of the inlet 3 and the outlet 4 are opened, and thus, the gas inside the exterior body 1 can be efficiently replaced with the dry air. That is, even when moisture enters into the inside of the exterior body 1 for any reason and gas and the like are generated after the exterior body 1 containing the battery cell 2 thereinside is sealed, it is possible to efficiently release moisture, gas, and the like from the inside of the exterior body 1 to the outside of the exterior body 1 through the outlet 4.

2. Battery System

The battery structure 10 is installed in a battery system, and may function as below.

2.1. Battery System 100

Figure 3A:
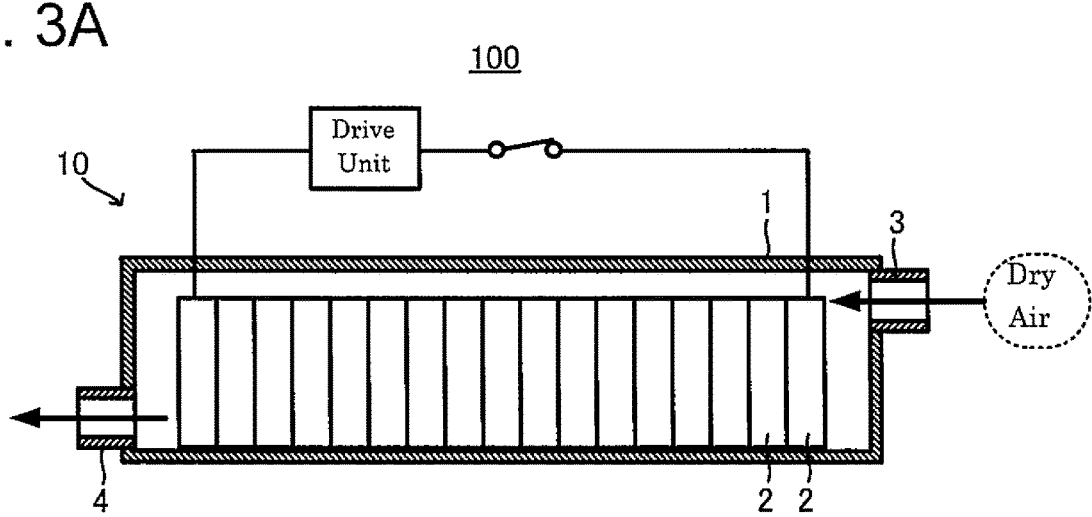
FIGS. 3A and 3B are schematically explanatory views of operation of a battery system 100.
Figure 3B:
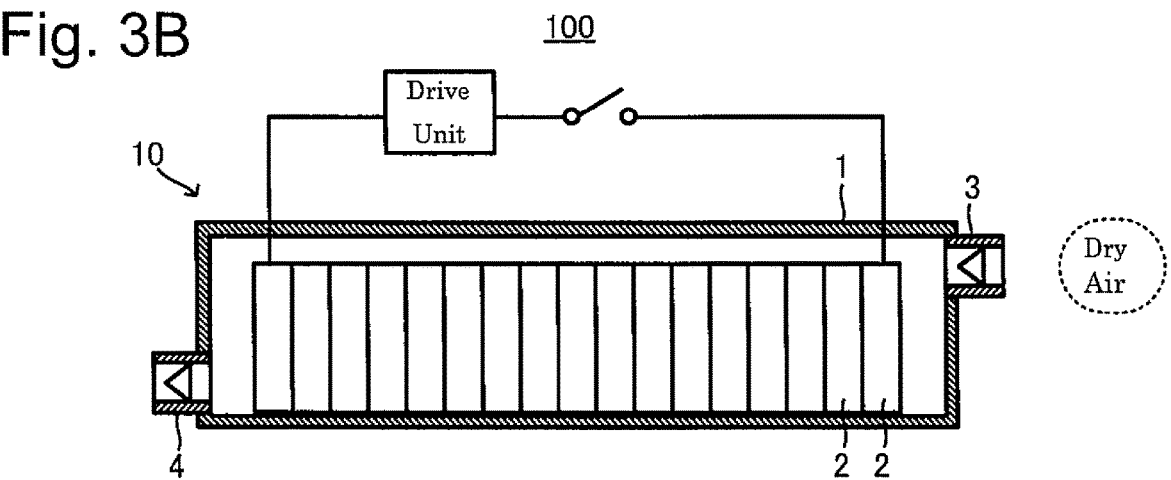

A battery system 100 will be described with reference to FIG. 3. The battery system 100 comprises the battery structure 10. Further, when the battery cell 2 is operated, the battery system 100 opens both of the inlet 3 and the outlet 4, and releases the gas inside the exterior body 1 to the outside of the exterior body 1 through the outlet 4 while introducing the dry air to the inside of the exterior body 1 through the inlet 3 (FIG. 3A). On the other hand, when the battery cell 2 is not operated, the battery system 100 closes both of the inlet 3 and the outlet 4, and keeps the pressure inside the exterior body 1 higher than atmospheric pressure (FIG. 3B).

As described above, by switching open/close condition of the inlet 3 and the outlet 4, and circulating condition of the dry air, at the time when the battery cell 2 is operated and when the battery cell 2 is not operated, it is possible to remove the moisture inside the exterior body 1 and the gas generated by battery materials while properly keeping the pressure inside the exterior body 1 higher than atmospheric pressure.

2.2. Battery System 200

A battery system 200 will be described with reference to FIG. 4. The battery system 200 comprises the battery structure 10. Further, when the pressure inside the exterior body 1 becomes a threshold value or below, the battery system 200 opens the inlet 3, and increases the pressure inside the exterior body 1 by introducing the dry air to the inside of the exterior body through the inlet 3. After increasing the pressure inside the exterior body 1, the inlet 3 is closed and the exterior body 1 is sealed again.

In the battery system 200, an opening and closing condition of the inlet 3, and circulating condition of the dry air are switched in accordance with the pressure change inside the exterior body 1. As "threshold value", pressure higher than atmospheric pressure can be employed. For example, the pressure is 0.11 MPa. Thereby, it is possible to keep the pressure inside the exterior body 1 higher than atmospheric pressure all the time, and properly inhibit an inrush of moisture to the inside of the exterior body.

When the battery structure 10 is applied to the battery system 200, the battery structure 10 preferably comprises a pressure sensor 201 which can measure the pressure inside the exterior body 1. The position where the pressure sensor 201 is placed is not particularly limited. A type of the pressure sensor 201 is not particularly limited, and any known pressure sensor can be employed.

It is noted that in the battery system 200, it is possible to keep the pressure inside the exterior body 1 higher than atmospheric pressure without providing the pressure sensor. For example, the change with time in pressure inside the exterior body 1 is verified to specify a time period during which the pressure inside the exterior body 1 can be kept equal to or above the threshold value. In the battery system 200, it is possible to keep the pressure inside the exterior body 1 higher than atmospheric pressure all the time by opening the inlet 3 regularly at each specified time period and increasing the pressure inside the exterior body 1 by introducing the dry air to the inside of the exterior body 1 through the inlet 3.

Alternatively, when the inlet 3 of the battery structure 10 comprises a non-return valve that opens and closes according to pressure change, the non-return valve of the inlet 3 opens and dry air at high pressure is introduced by the other end side of the inlet 3 (outer side of the exterior body 1) being in contact with the dry air which has pressure higher than the threshold value when the pressure inside the exterior body 1 becomes the threshold value or below. When the pressure inside the exterior body 1 becomes higher than the threshold by the dry air, the non-return valve closes and the exterior body 1 is sealed, and the pressure inside the exterior body 1 can be kept higher than atmospheric pressure.

2.3. Battery System 300

Figure 5:
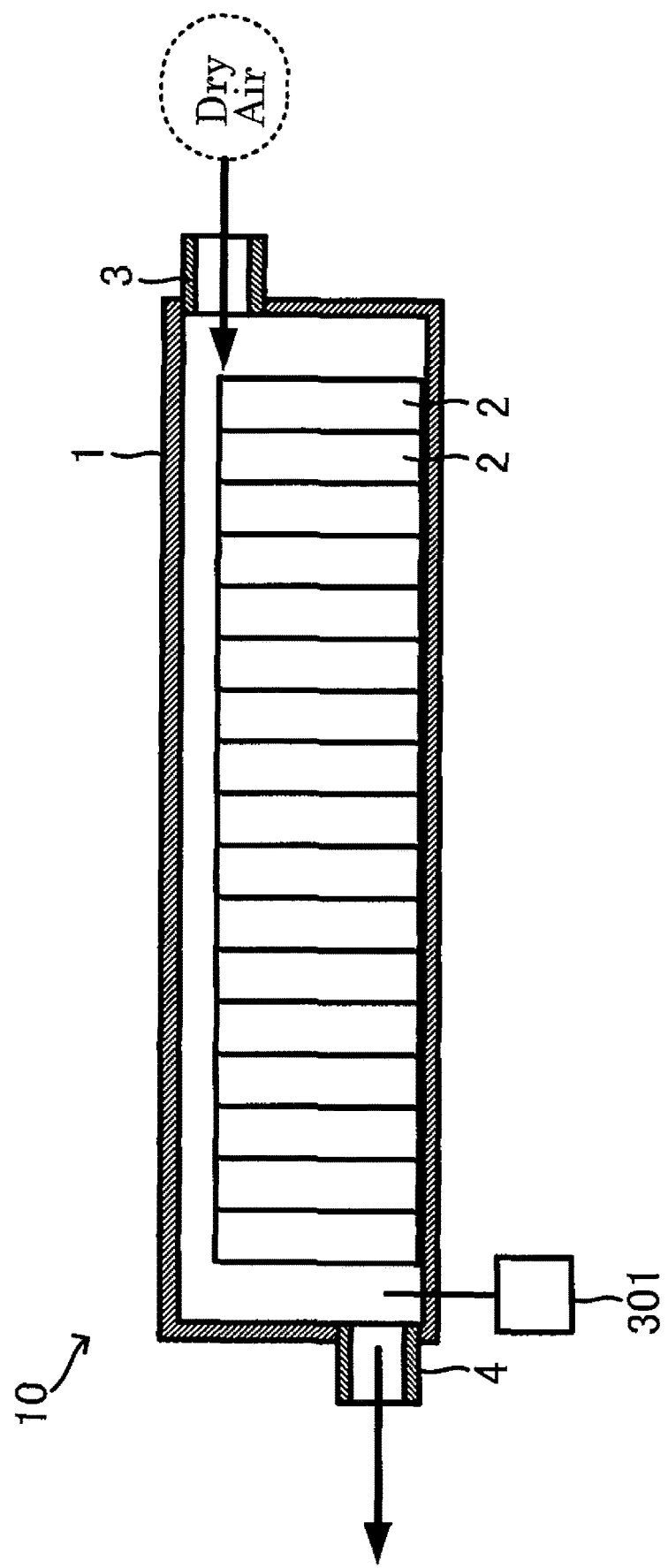
FIG. 5 is a schematically explanatory view of operation of a battery system 300.

A battery system 300 will be described with reference to FIG. 5. The battery system 300 comprises the battery structure 10. When both of the inlet 3 and the outlet 4 are opened, the battery system 300 releases the gas inside the exterior body 1 to the outside of the exterior body 1 through the outlet 4 while introducing the dry air to the inside of the exterior body 1 through the inlet 3.

In the battery system 300, various timings to open both of the inlet 3 and the outlet 4 can be considered.

For example, (1) when the amount of the moisture inside the exterior body 1 becomes the threshold value or over, both of the inlet 3 and the outlet 4 are opened. In this case, by providing a sensor to detect the amount of the moisture inside the exterior body 1, it is possible to grasp the amount of the moisture inside the exterior body 1. Alternatively, it is possible to grasp the amount of the moisture inside the exterior body 1 with a hygrometer. The sensor to detect moisture or the hygrometer may be placed anywhere inside the exterior body 1.

Alternatively, (2) when the concentration of the gas different from air (the gas generated inside the exterior body 1, for example, hydrogen sulfide or carbon monoxide generated by decomposition of battery materials) inside the exterior body 1 becomes the threshold value or over, both of the inlet 3 and the outlet 4 are opened. In this case, by providing a sensor 301 (for example, hydrogen sulfide sensor or carbon monoxide sensor) for detecting concentration of specific gas inside the exterior body 1, it is possible to grasp the concentration of specific gas inside the exterior body 1. The sensor 301 is preferably placed at a position closer to the outlet 4 than the inlet 3 inside the exterior body 1, and as shown in FIG. 5, the sensor 301 is preferably placed in the vicinity of the outlet 4 (within 10 cm from the outlet 4) inside the exterior body 1. Alternatively, when the pressure inside the exterior body 1 becomes higher than the pressure of the introduced dry air, it is possible to determine that the gas other than air is generated. That is, by measuring the pressure inside the exterior body 1, it is possible to indirectly grasp the concentration of the gas generated inside the exterior body 1. In this case, a pressure sensor may be used instead of the sensor 301. The pressure sensor may be placed anywhere inside the exterior body 1.

Alternatively, (3) both of the inlet 3 and the outlet 4 may be opened at the time of periodic inspection of the battery system 300, and after the inspection, to perform the above-mentioned dry air introduction etc. As a result, it is possible to properly remove the moisture and the gas that have entered into the inside of the exterior body 1 in the inspection.

Alternatively, (4) as described above, both of the inlet 3 and the outlet 4 may be opened during the operation of the battery cell 2 to introduce and release the dry air.

In the battery system 300, after the introduction of the dry air and the removal of the gas inside the exterior body 1 are completed, both of the inlet 3 and the outlet 4 are closed, and the exterior body 1 is sealed to keep the pressure thereinside higher than atmospheric pressure. In the battery system 300, timings to terminate the introduction of the dry air and removal of the gas inside the exterior body are not particularly limited. As described above, according to the battery system 300, it is possible to appropriately remove the moisture entered inside the exterior body 1 and the gas generated inside the exterior body 1 to the outside of the exterior body 1.

2.4. Other Configurations

The battery system comprising the battery structure 10 employs any configuration of: closing both of the inlet 3 and the outlet 4; opening only the inlet 3; opening only the outlet 4; and opening both of the inlet 3 and the outlet 4. That is, when both of the inlet 3 and the outlet 4 are closed, the exterior body 1 is sealed. Further, when only the inlet 3 is opened, for example, it is possible to increase the pressure inside the exterior body 1 by introducing the dry air to the inside of the exterior body 1 through the inlet 3. In addition, when only the outlet 4 is opened, for example, it is possible to release the moisture and the like inside the exterior body 1 to the outside of the exterior body 1 by the pressure inside the exterior body 1. Furthermore, when both of the inlet 3 and the outlet 4 are opened, for example, it is possible to release the gas inside the exterior body 1 to the outside of the exterior body 1 through the outlet 4 while introducing the dry air to the inside of the exterior body 1 through the inlet 3.

As described above, in the battery system comprising the battery structure 10, control of opening and closing of the inlet 3, control of opening and closing of the outlet 4, and various operation controls including introduction of dry air are required. These are enabled by applying known control means. Description thereof is omitted since these are obvious for the person skilled in the art.

In addition, in the above description, the embodiments of the battery systems 100, 200 and 300 are explained separately. However, it is also possible to combine at least two of the battery systems 100, 200 and 300 to configure one battery system.

As described above, according to the battery system comprising the battery structure 10, by increasing the pressure inside the exterior body 1 to be higher than atmospheric pressure, it is possible to inhibit the inrush of the moisture under atmospheric pressure existing the outside of the exterior body 1, into the inside of the exterior body 1. On the other hand, even when moisture enters into the inside of the exterior body 1 due to some circumstances and the gas and the like are generated after the exterior body 1 containing the battery cell 2 thereinside is sealed, it is possible to efficiently remove the moisture, the gas, and the like from the inside of the exterior body 1 to the outside of the exterior body 1 through the outlet 4.

3. Vehicle

A vehicle 500 will be described with reference to FIG. 6. The vehicle 500 comprises the above-described battery system. In the vehicle 500, the outlet 4 of the exterior body 1 is connected to an exhaust duct 501 of the vehicle 500, and gas exhausted from the inside of the exterior body 1 to the outside of the exterior body 1 through the outlet 4 is exhausted to the outside of the vehicle 500 through the exhaust duct 501.

As described above, by connecting the outlet 4 to the exhaust duct 501, it is possible to prevent the interior vehicle from being filled with the gas generated inside the exterior body 1 (for example, the above-described hydrogen sulfide or carbon monoxide). In addition, by the flow of the gas in the exhaust duct 501, it is possible to efficiently remove the gas inside the exterior body 1 to the outside of the exterior body 1 without retention of the gas inside the exterior body 1 in the vicinity of the exit of the outlet 4.

INDUSTRIAL APPLICABILITY

The battery structure and the battery system of the present disclosure can be used as a large-sized power source for mounting vehicles.

REFERENCE SIGNS LIST 10 battery structure
1 exterior body
2 battery cell
3 inlet
4 outlet
5 structure for drying air
6 space
7 outside air supply port
8 structure for pressurizing air
100 battery system
200 battery system
201 pressure sensor
300 battery system
301 sensor detecting concentration of specific gas
500 vehicle
501 exhaust duct

What is claimed is:

1. A battery structure comprising:
an exterior body; and
at least one battery cell contained inside the exterior body, the exterior body comprising:
an openable and closable inlet introducing dry air from an outside of the exterior body to an inside of the exterior body; and
an openable and closable outlet separate from the inlet, and the outlet releasing gas from the inside of the exterior body to the outside of the exterior body,
wherein:
a hygroscopic material is arranged on an upstream side of the inlet;
when the inlet and the outlet are closed, pressure inside the exterior body is kept higher than atmospheric pressure;
the openable and closable inlet is a non-return valve and is configured to automatically open when the pressure inside the exterior body reaches a first threshold; and
the openable and closable outlet is a non-return valve and is configured separately from the openable and closable inlet to automatically open when the pressure inside the exterior body reaches a second threshold, the second threshold having a value that is equal to or greater than a value of the first threshold.

2. The battery structure according to claim 1, comprising a pressure raising pump arranged on an upstream side of the inlet.

3. A battery system comprising the battery structure according to claim 1, wherein the battery system is configured to:
when the battery cell is operated,
open both of the inlet and the outlet, and
release the gas from the inside of the exterior body to the outside of the exterior body through the outlet while introducing the dry air to the inside of the exterior body through the inlet; and
when the battery cell is not operated,
close both of the inlet and the outlet, and
keep the pressure inside the exterior body higher than atmospheric pressure.

4. A battery system comprising the battery structure according to claim 1, wherein the battery system is configured to
open the inlet, and increase the pressure inside the exterior body by introducing the dry air to the inside of the exterior body through the inlet, when the pressure inside the exterior body is equal to or less than the first threshold.

5. A battery system comprising the battery structure according to claim 1, wherein the battery system is configured to release the gas from the inside of the exterior body to the outside of the exterior body through the outlet while introducing the dry air into the inside of the exterior body through the inlet, when both of the inlet and the outlet are opened.

6. The battery system according to claim 5, wherein the battery system is configured to
open both of the inlet and the outlet, when an amount of moisture inside the exterior body is equal to or greater than a third threshold.

7. The battery system according to claim 5, wherein the battery system is configured to
open both of the inlet and the outlet, when concentration of the gas generated inside the exterior body is equal to or greater than a fourth threshold.

8. A vehicle comprising the battery system according to claim 3, wherein
the outlet of the exterior body is connected to an exhaust duct of the vehicle, and
the gas which is released to the outside of the exterior body through the outlet from the inside of the exterior body is exhausted through the exhaust duct to an outside of the vehicle.

9. A vehicle comprising the battery system according to claim 4, wherein
the outlet of the exterior body is connected to an exhaust duct of the vehicle, and
the gas which is released to the outside of the exterior body through the outlet from the inside of the exterior body is exhausted through the exhaust duct to an outside of the vehicle.

10. A vehicle comprising the battery system according to claim 5, wherein
the outlet of the exterior body is connected to an exhaust duct of the vehicle, and
the gas which is released to the outside of the exterior body through the outlet from the inside of the exterior body is exhausted through the exhaust duct to an outside of the vehicle.

11. The battery structure according to claim 1, comprising a heater arranged on an upstream side of the inlet.

* * * * *